(12) United States Patent
Curlander et al.

(10) Patent No.: US 10,044,987 B1
(45) Date of Patent: Aug. 7, 2018

(54) IMAGE PROCESSING SYSTEM

(71) Applicant: AMAZON TECHNOLOGIES, INC., Seattle, WA (US)

(72) Inventors: James Christopher Curlander, Mercer Island, WA (US); Pragyana K. Mishra, Seattle, WA (US); Venketaram Ramachandran, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 539 days.

(21) Appl. No.: 14/566,280

(22) Filed: Dec. 10, 2014

(51) Int. Cl.
*H04N 7/18* (2006.01)

(52) U.S. Cl.
CPC ................. *H04N 7/181* (2013.01)

(58) Field of Classification Search
None
See application file for complete search history.

(56) References Cited

U.S. PATENT DOCUMENTS

| 2014/0266791 A1* | 9/2014 | Lloyd | H04Q 9/00 340/870.09 |
| 2015/0124109 A1* | 5/2015 | Kryeziu | H04N 5/23206 348/211.3 |

* cited by examiner

*Primary Examiner* — Eileen M Adams
(74) *Attorney, Agent, or Firm* — Lowenstein Sandler LLP

(57) ABSTRACT

A surveillance system including a number of image capturing devices is described. A processing device may receive an image from one of the image capturing devices and determine a device identifier of the image capturing device. The processing device may further detect a machine-readable target in the image and generate data based on the detection. The processing device may store the data in association with the device identifier in a data structure.

17 Claims, 7 Drawing Sheets

IMAGE PROCESSING SYSTEM

BACKGROUND

Many sites, such as warehouses, retail shopping centers, amusement parks, and so on include a surveillance system including cameras for security and other reasons. Such a surveillance system may include a large number of cameras located over a large area. Although the cameras may be deployed according to a plan, at least some of the cameras may be positioned or pointed incorrectly or may be otherwise misconfigured so as to not capture the subject matter or location of interest. Furthermore, conditions may change and the original subject matter of the camera may be moved to another location and different subject matter placed at the location. Accordingly, it may be difficult to determine the subject in view of each camera or the extent of its field of view.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

Figure 1:
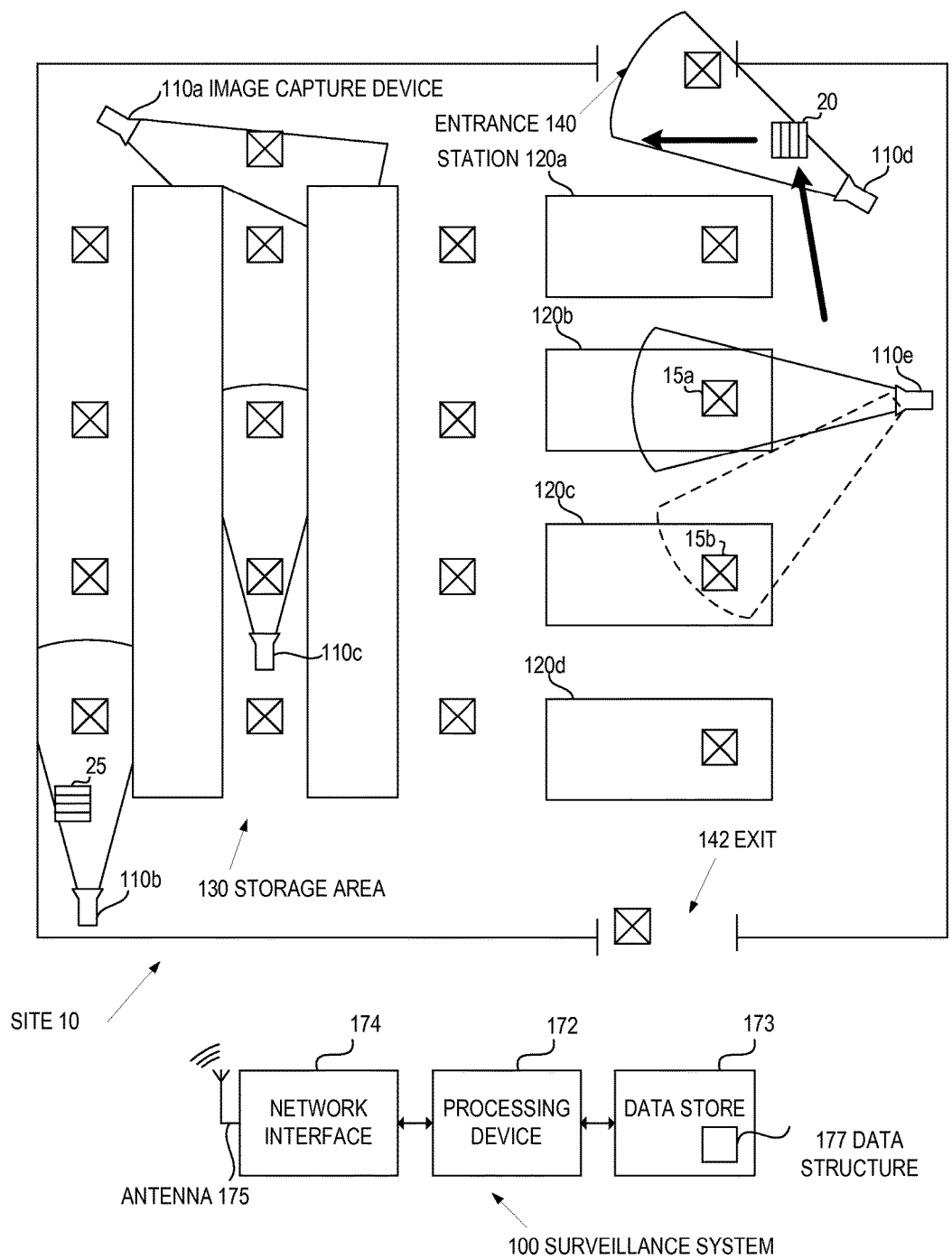
FIG. 1 illustrates an embodiment of a surveillance system surveying an example site.

Described herein is a system that generates data regarding a camera based on detection of a machine-readable target in an image captured by the camera. The system may store the generated data in association with a camera identifier of the camera that captured the image. The system may, for example, determine the subject in view of the image captured by the camera by detecting a machine-readable target that encodes a subject identifier. For a number of cameras, the system may store a subject identifier in association with a camera identifier, thereby generating a table or other data structure indicating the subject in view of each camera.

As another example, the system may determine a field of view of a camera by detecting fixed or moving machine-readable targets in a subset of images captured by the camera. For each image in which the machine-readable target is detected, the system may determine the location of the machine-readable target when the image was captured. The system may define a field of view encompassing these locations or otherwise generate a field of view for the camera based on the locations. For a number of cameras, the system may store the field of view in association with a camera identifier, thereby creating a data structure describing the field of view for each of a number of cameras.

The system may generate other forms of data as described in further detail below. For example, the system may generate a configuration for a camera based on a machine-readable target detected in an image captured by the camera. As another example, the system may generate descriptive data describing the camera (such as a device identifier, orientation information, hardware information, etc.) based on a machine-readable target detected in an image captured by the capture. The system may generate any kind of data associated with a camera based on detection of machine-readable target in an image captured by the camera.

As an example, a site may have a number of machine-readable targets applied to various subjects located at the site, each of the machine-readable targets encoding a different subject identifier identifying the subject to which the machine-readable target is applied. An image received from a camera having a view of a particular subject (e.g., "Receive Station 2") may include a machine-readable target encoding a subject identifier of "Receive Station 2." The image may be processed to decode the subject identifier and determine that the camera has a view of "Receive Station 2."

If the camera is moved (either intentionally or inadvertently) or if "Receive Station 2" is moved and replaced with a different subject (e.g., "Prep Station 5"), a later image received from the camera may include a machine-readable target encoding a subject identifier of "Prep Station 5." The image may be processed to decode the subject identifier and determine that the camera now has a view of "Prep Station 5."

As another example, a machine-readable target may be moved about a site to various locations. When the machine-readable target is detected in an image from a camera, the location of the machine-readable target at the time the image was captured may be determined. By aggregating the locations derived from various images in which the machine-readable target is detected, the field of view of the camera (e.g., the set of locations viewed by the camera) may be determined.

FIG. 1 illustrates an embodiment of a surveillance system 100 surveying an example site 10, such as a warehouse, fulfillment center or other facility or location. The site 10 includes a number of different locations, including a number of stations 120a-120d, a storage area 130, an entrance 140, and an exit 142.

The site 10 is surveyed by a surveillance system 100. The surveillance system 100 may have one or multiple image capturing devices 110a-110e that capture images of at least a portion the site 10 or subjects of interest within the site 10. Although five image capturing devices 110a-110e are illustrated in FIG. 1, it is to be appreciated that the surveillance system 100 may include any number of image capturing devices. In particular, the surveillance system 100 may include hundreds or thousands of image capturing devices. Each image capturing device 110a-110e may include a lens that focuses an image onto an image sensor. The image sensor may be, for example, a charge-coupled device (CCD). Each image capturing device 110a-110e may be, for example, a video camera, a still camera, a digital camera, a PTZ (pan-tilt-zoom) camera, a scanner, or any other kind of camera or image capturing device.

In one embodiment, the automated surveillance system 100 includes a processing device 172 and/or data store 173 to which the image capturing devices 110a-110e send image data. The processing device 172 may store the image data in the data store 173. The image capturing devices 110a-110e may communicate with the processing device 172 via a network interface 174. In one embodiment, the image capturing devices 110a-110e communicate with the processing device 172 using a IP (internet protocol) protocol, with each message from the image capturing device 110a-110e including an IP address of the image capturing device 110a-110e and the processing device 172. In one embodiment, some or all of the image capturing devices 110a-110e communicate with the processing device 172 wirelessly via one or more antennas 175. Wireless connections may include point-to-point (P2P), point to multipoint, or mesh wireless links Some or all of the image capturing devices 110a-110e may alternatively communicate with the processing device 172 via wired connections.

Each image capturing device 110a-110e may capture images of a subject, such as a particular location or object. For example, a first image capturing device 110a may capture images of a front of the storage area 130. A second image capturing device 110b may capture images of a rear of a first aisle of the storage area 130. A third image capturing device 110c may capture images of a middle of a second aisle of the storage area 130. A fourth image capturing device 110d may capture images of the entrance 140. A fifth image capturing device 110e may capture images of a station 120b, such as a receive station, a stow station, a retrieve station, a shipping station, or any other kind of station.

Machine-readable targets may be placed on various subjects within the site 10. For example, each station 120a-120d may have a machine-readable target placed on it. Machine-readable targets may be placed at the entrance 140 and exit 142 and at various locations in the storage area 130. Machine-readable targets may also be placed at other locations or on other subjects within the site 10.

Each machine-readable target may be detectable in a captured image using computer image processing techniques. In some embodiments, the machine-readable target may encode information that can be decoded once detected using image processing techniques. For example, a machine-readable target may include a matrix barcode (also called a two-dimensional barcode), such as a QR [quick response] code, a one-dimensional barcode, a color pattern, machine-readable text, or any other detectable target. In one embodiment, a machine-readable target is a matrix barcode approximately 12 inches by 12 inches applied to a wall, floor, or surface of a station.

Each image capturing device 110a-110e may transmit images to the processing device 172. For each received image, the processing device 172 may determine a device identifier for the image capturing device 110a-110e that captured the image. The device identifier may include, for example, a device name, a device number, an IP address of the image capturing device 110a-110e, a MAC (media access control) address of the image capturing device 110a-110e or any other identifier that uniquely identifies the image capturing device 110a-110e.

The processing device 172 may analyze a received image to detect one or more machine-readable targets within the image. The processing device 172 may determine the subject in view of an image capturing device 110a-110e based on this detection. For example, the processing device 172 may detect a machine-readable target 15a in a first image received from the fifth image capturing device 110e. The processing device 172 may decode the machine-readable target 15a to determine a subject identifier. For example, the subject identifier may indicate that the machine-readable target 15a is attached to "Receive Station 2." The processing device 172 may store the subject identifier in association with the device identifier of the fifth image capturing device 110e in a data structure 177 in the data store 173.

If the fifth image capturing device 110e is repositioned (either intentionally or inadvertently), the processing device 172 may detect a different machine-readable target 15b in a second image received from the fifth image capturing device 110e. The processing device 172 may decode the machine-readable target 15b to determine a different subject identifier. For example, the subject identifier may indicate that the machine-readable target 15b is attached to "Receive Station 3." The processing device 172 may store the subject identifier in association with the device identifier of the fifth image capturing device 110e in the data structure 177 in the data store 173. Similarly, if the subject in view of the fifth image capturing device 110e is changed, e.g., "Receive Station 2" is moved to elsewhere in the site 10 and replaced by "Stow Station 7," the processing device 172 may detect and decode a machine-readable target applied to the new subject and update the data structure 177.

The processing device 172 may repeat this process for a number of different images from the various image capturing devices 110a-110e to populate or update the data structure 177, thereby generating a data structure 177 that indicates the subject in view of each image capturing device 110a-110e.

As noted above, the processing device 172 may analyze a received image to detect one or more machine-readable targets within the image. The processing device 172 may determine a field of view of an image capturing device 110a-110e based on this detection. The field of view of an image capturing device 110a-110e may be a function of a number of factors, such as the position and orientation of the image capturing device, focal length or other settings of the image capturing device, the three-dimensional shape of the subject, etc.

A machine-readable target 20 may be moved about the site 10 to various locations at the site 10. The machine-readable target 20 may be accompanied by a navigation unit that records the location of the machine-readable target 20 at particular points in time. The navigation unit may be collated with the machine-readable target as it is moved to various locations at the site. The navigation unit may include an internal GPS (global positioning system), an inertial navigation unit, a SLAM (simultaneous location and mapping) module, or any other location recording device. The navigation unit may be indoors or outdoors. The navigation unit may include a recorder in which a user inputs a location from time to time. The recorded location may be a particular location in a defined coordinate system or a general description of a location, e.g., near the entrance 140, between a first station 120a and a second station 120b, in a first aisle of the storage 130, etc.

The processing device 172 may receive the location information of the machine-readable target 20 as a function of time and may also receive a plurality of images from the fourth image capturing device 110d. The processing device 172 may detect the machine-readable target 20 in a subset of the images. For each of the images of the subset in which the machine-readable target 20 is detected, the processing device 172 determines the location of the machine-readable target at the time the image was captured using the location information from the navigation unit. Thus, the processing device 172 determines a set of locations at which the machine-readable target 20 was observable by the fourth image capturing device 110d.

The processing device 172 may generate field of view data describing a field of view for the fourth image capturing device 110d based on the set of locations. In one embodiment, the field of view data may simply be the set of locations. In another embodiment, the field of view data may describe a polygon or other two-dimensional shape including the locations. In another embodiment, the field of view data may described a three-dimensional shape (e.g., using additional information such as altitude, position, and orientation information of the image capturing device) based on the locations.

The processing device 172 may also determine a field of view of an image capturing device 110a-110e based on the detection of one or more fixed machine-readable targets at known locations instead of, or in addition to, moving targets. The processing device 172 may detect a fixed machine-readable target and decode the machine-readable target to determine a location in the field of view of the image capturing device 110a-110e. In one embodiment, the image capturing device decodes the machine-readable target to determine a subject identifier, as described above, and determines a location of the subject associated with the subject identifier based on information stored in a table correlating subject and location.

As described above with respect to subject in view of the image capturing device, the processing device 172 may analyze a received image to detect a machine-readable target within the image that encodes information. The encoded information may be any data to be associated with the image capturing device in the data structure. As described above, the encoded information may be a subject identifier. In another embodiment, the encoded information may include configuration information for the image capturing device. For example, the processing device 172 may detect a machine-readable target 25 in a first image received from the second image capturing device 110b. The processing device 172 may decode the machine-readable target 25 to determine a configuration for the image capturing device 110b. For example, the configuration may include one or more configuration parameters, such as exposure time, day/night mode, auto-gain, frame rate, etc. The encoded information may include the configuration parameters, a configuration command executable by the processing device 172 (or by a processing device within the image capturing device 110b) to configure the image capturing device 110b, a reference to a web-based configuration file, or other information from which the configuration can be determined.

A machine-readable target may be used to reconfigure image capturing devices that are exposed to unique local circumstances, such as dust or fog, so that they may adapt to these situations. An image capturing device may be reconfigured for a temporary amount of time due to locally varying circumstances, such as construction. Rather than attempting to determine which image capturing devices may be affected by special circumstances, a machine-readable target from which a configuration may be determined may be moved around the area that will be affected. All image capturing devices detecting the machine-readable target may be reconfigured using the configuration.

Figure 2:
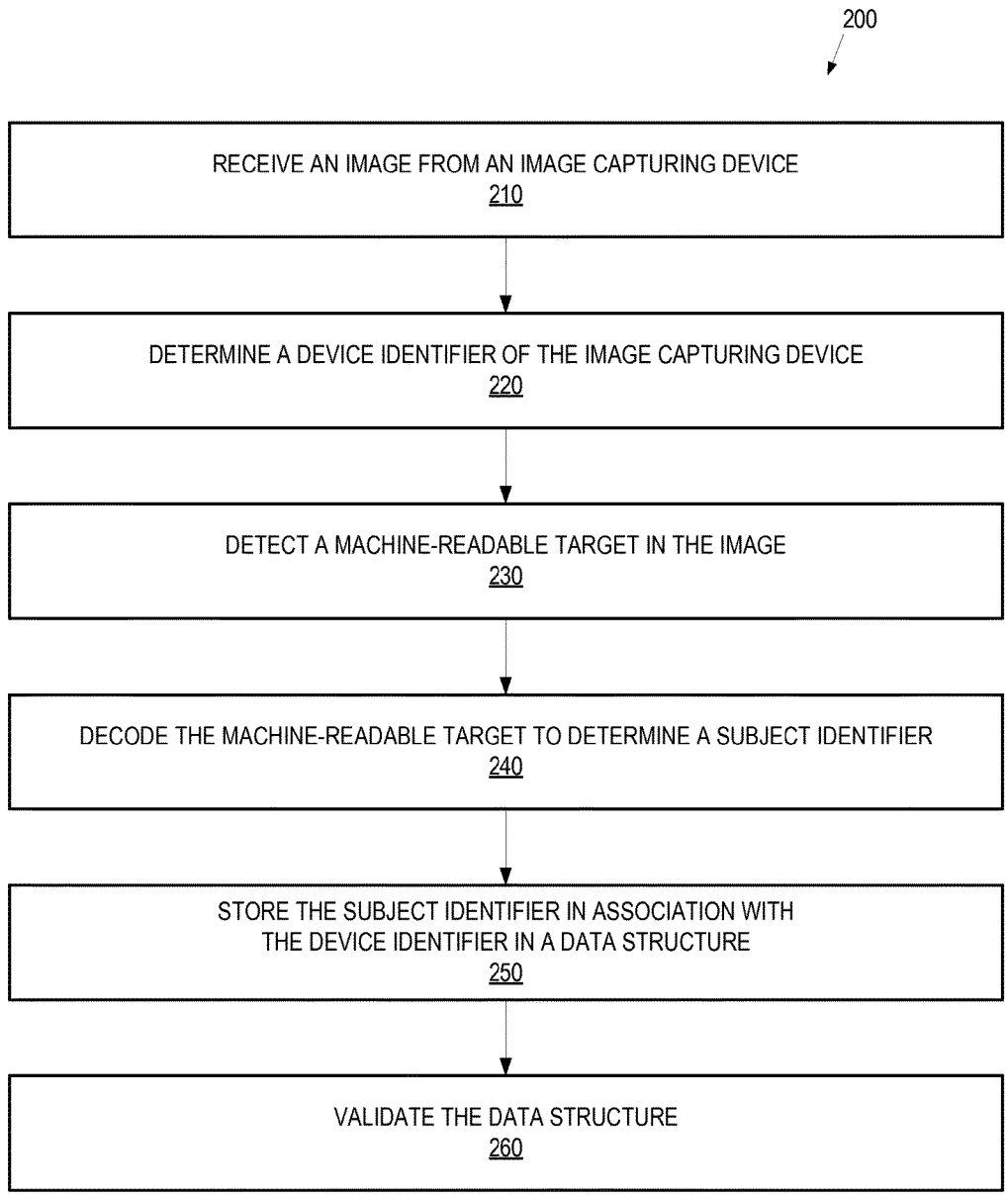
FIG. 2 is a flowchart illustrating an embodiment of a method of determining a subject in view of an image capturing device.

FIG. 2 is a flowchart illustrating an embodiment of a method 200 of determining a subject in view of an image capturing device. The method 200 may be performed by processing logic that may include hardware (e.g., circuitry, dedicated logic, programmable logic, microcode, etc.), software (e.g., instructions executed by a processing device), firmware or a combination thereof. For example, the method 200 may be performed by the surveillance system 100 of FIG. 1. It is to be appreciated that the method 200 may be performed for any number of images or image capturing devices consecutively or concurrently. However, for ease of reference, the method 200 is described for a single image of a single image capturing device in FIG. 2.

The method 200 may be performed, for one or multiple image capturing devices, in response to a command to determine the subject. For example, the method 200 may be initially performed upon deployment of the image capturing device or in response to a reconfiguration of a site. The method 200 may be performed periodically. For example, the method 200 may be performed daily or hourly to ensure the subject information is accurate and up-to-date.

At block 210 of method 200, the processing logic receives an image from an image capturing device. The image may be a color or black-and-white image. The image may be a frame of a video stream received from the image capturing device. The image may be received over a wired or wireless communication link. In one embodiment, the image is received over the internet using an IP protocol.

At block 220, the processing logic determines a device identifier of the image capturing device. In one embodiment, the device identifier is an IP address of the image capturing device. In one embodiment, the image is received (in block 210) as part of a message. The message may include the IP address of the image capturing device and the processing logic in routing information which may be located in a header of the message. The IP address of the image capturing device may be determined by analyzing the routing information. The device identifier may be a MAC (media access control) address of the image capturing device. The MAC address may be included in the message. For example, the MAC address may be included in the body of the message.

The device identifier may be a device name, a device number, or any other identifier that uniquely identifies the image capturing device. Although, as noted above, the device identifier may be an IP address or MAC address of the image capturing device, the device identifier may also be derived from the IP address or MAC address. For example, the device identifier may be determined based on a table that associates IP addresses with specific device identifiers.

At block 230, the processing logic detects a machine-readable target in the image. The machine-readable target may include a matrix barcode (e.g., a QR [quick response] code), a one-dimensional barcode, a color pattern, machine-readable text, or any other detectable target. The machine-readable target may be detected using computer image processing techniques. The processing logic may detect one or more machine-readable targets in a single image.

At block 240, the processing logic decodes the machine-readable target to determine a subject identifier. The subject identifier may be a subject name, a subject number, or any other identifier that identifies the subject of the image. The subject identifier may uniquely identify the subject or may identify a class to which the subject belongs. For example, the subject identifier may indicate that the subject is a receive station or may specifically indicate that the subject is "Receive Station 4."

In some embodiments, the machine-readable target may encode information that can be decoded once detected using image processing techniques. For example, as noted above, the machine-readable target may include a barcode that encodes the subject identifier. In one embodiment, the machine-readable target encodes the subject identifier. In another embodiment, the machine-readable target encodes information which may be used to determine the subject identifier. For example, the machine-readable target may encode a target identifier that is used to determine the subject identifier by consulting a table that associates target identifiers with subject identifiers.

In some embodiments, the machine-readable target does not directly encode information and the subject identifier is determined through further processing. For example, the machine-readable target may be a distinctly shaped color icon (e.g., a triangle, a chevron, a hexagon, or any other shape) detectable using image processing techniques. The processing logic may determine the subject identifier based on the color of the icon. For example, the processing logic may determine a subject identifier that indicates that the subject is a receive station based on the detection of a blue chevron and determine a subject identifier that indicates that the subject is a stow station based on the detection of a yellow chevron.

At block 250, the processing logic stores the subject identifier in association with the device identifier. The processing logic may store the subject identifier in association with the device identifier in a data structure in a memory. The data structure may be, for example, a table, a database or other data structure including a number of entries, each entry including a device identifier element that stores a device identifier and a subject identifier element that stores the subject identifier. Storing the subject identifier in association with the device identifier may include generating a new entry or updating an existing entry.

For example, the processing logic may determine that the data structure includes an entry for the device identifier and store the subject identifier in the entry. The processing logic may determine that the data structure does not include an entry for the device identifier and create a new entry for the device identifier and store the device identifier and the subject identifier in the new entry.

At block 260, the processing logic validates the data structure. The processing logic may validate the data structure by applying one or more criteria to the data structure and determining whether the criteria are met.

In one embodiment, the processing logic determines whether the image capturing device is capturing the appropriate subject. For example, an entry in the data structure for the image capturing device may include a device identifier element storing the device identifier, a subject element storing the subject identifier, and an expected subject element storing the subject identifier of an expected subject of the image. The processing logic may validate the data structure by determining that the subject identifier (determined in block 240) matches the subject identifier of the expected subject of the image. The processing logic may generate a notification or alarm if the determined subject identifier does not match the expected subject identifier. The notification may indicate that the image capturing device is misaligned, misplaced, or malfunctioning (e.g., has a fouled lens, is out of focus, or otherwise misconfigured), that the intended subject is not at its expected location (e.g., has been moved or is missing), or that some other error has occurred.

In one embodiment, the processing logic determines whether each image capturing device is capturing an image of a labelled subject. For example, the processing logic may validate the data structure by determining that each entry including a device identifier also includes a subject identifier. The processing logic may generate a notification or alarm if the processing logic determines that an entry does not include a subject identifier. As above, the notification may indicate that an image capturing device is misaligned, misplaced, or malfunctioning (e.g., has a fouled lens, is out of focus, or otherwise misconfigured), that the intended subject is not at its expected location (e.g., has been moved or is missing), or that some other error has occurred.

In one embodiment, the processing logic determines whether an image of each of a number of subjects is captured by at least one image capturing device. The processing logic may receive a list of designated subject identifiers of designated subjects and determine whether each designated subject identifier is stored in the data structure in at least one entry in association with at least one device identifier. The processing logic may generate a notification or alarm if at least one of the designated subject identifiers is not stored in the data structure in at least one entry in association with at least one device identifier. The notification may indicate, for example, that a particular important subject (e.g., an exit) is not being imaged.

The data structure may be used in a number of ways. In one embodiment, the data structure may be searched by device identifier or subject identifier to retrieve images associated with a particular image capturing device or a particular subject. For example, using a software interface, a user may enter a subject identifier for a particular subject and retrieve images of that subject without knowing, a priori, the device identifier of the image capturing device pointed at that subject. As another example, the user may retrieve images from an image capturing device and the images may be shown with an indicator of the subject of the images based on the subject identifier associated with the device identifier of the image capturing device.

Thus, a particular subject includes a machine-readable target that is used for relating the subject to the retrievable image/video from one or more image capturing devices. If there are many image capturing devices and the subject is moved (or is repositioned) such that it is in the field of view of a second image capturing rather than a first image capturing device, when a user requests the image/video of the particular subject (e.g., by inputting a subject identifier into a software interface), the system decodes the machine-readable target affixed to the particular subject in images from the second image capturing device and provides images from that image capturing device to the user. The subject can moved to a different image capturing device and requested images of the subject would be provided from that image capturing device. In this way, the user is agnostic to which image capturing device is directed towards the subject, but may consistently retrieve images of the subject.

Figure 3A:
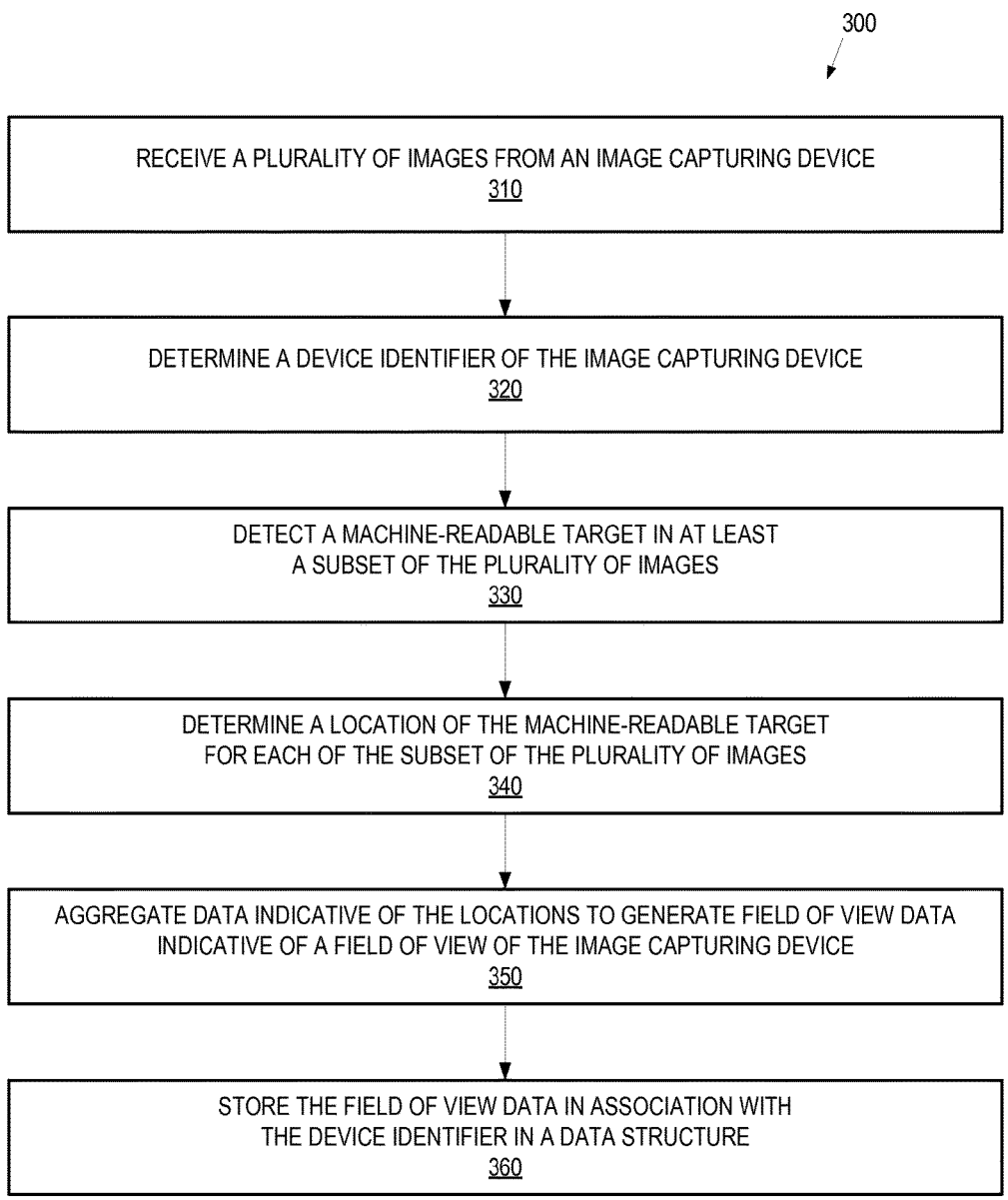
FIG. 3A is a flowchart illustrating an embodiment of a method of determining a field of view of an image capturing device.

FIG. 3A is a flowchart illustrating an embodiment of a method 300 of determining a field of view of an image capturing device. The method 300 may be performed by processing logic that may include hardware (e.g., circuitry, dedicated logic, programmable logic, microcode, etc.), software (e.g., instructions executed by a processing device), firmware or a combination thereof. For example, the method 300 may be performed by the surveillance system 100 of FIG. 1. It is to be appreciated that the method 300 may be performed for any number of image capturing devices consecutively or concurrently. However, for ease of reference, the method 300 is described for a single image capturing device in FIG. 3A.

The method 300 may be performed, for one or multiple image capturing devices, in response to a command to determine the field of view. For example, the method 300 may be initially performed upon deployment of the image capturing device or in response to a reconfiguration of a site.

At block 310 of method 300, the processing logic receives a plurality of images from an image capturing device. The images may be a color or black-and-white images. The images may be frames of a video stream received from the image capturing device. The images may be received over a wired or wireless communication link. In one embodiment, the images are received over the internet using an IP protocol.

At block 320, the processing logic determines a device identifier of the image capturing device. In one embodiment, the device identifier is an IP address of the image capturing device. In one embodiment, the images are received (in block 310) as part of one or more messages. The messages may include the IP address of the image capturing device and the processing logic in routing information which may be located in a header of the message. The IP address of the image capturing device may be determined by analyzing the routing information. The device identifier may be a MAC (media access control) address of the image capturing device. The MAC address may be included in the body of the message.

The device identifier may be a device name, a device number, or any other identifier that uniquely identifies the image capturing device. Although, as noted above, the device identifier may be an IP address or MAC address of the image capturing device, the device identifier may also be derived from the IP address or MAC address. For example, the device identifier may be determined based on a table that associates IP addresses with specific device identifiers.

At block 330, the processing logic detects a machine-readable target in at least a subset of the images. The machine-readable target may include a matrix barcode (e.g., a QR [quick response] code), a one-dimensional barcode, a color pattern, machine-readable text, or any other detectable target. The machine-readable target may be detected using computer image processing techniques. The processing logic may detect one or more fixed or moving machine-readable targets in the subset of images.

At block 340, the processing logic determines, for each of the subset of the plurality of images, a location of the machine-readable target at a time the image was captured. Thus, the processing logic determines a set of locations at which the machine-readable target was observable by the image capturing device.

The location may be based on received location information of the machine-readable target that indicates a location of the machine-readable target as a function of time. In one embodiment, the machine readable target is moved, manually or automatically, about a site or other location. The machine-readable target may be accompanied by a navigation unit collocated with the machine-readable target that records the location of the machine-readable target at particular points in time as it is moved to various locations at the site. The navigation unit may include an internal GPS (global positioning system), an inertial navigation unit, a SLAM (simultaneous location and mapping) module, a dead reckoning module, or any other location recording or positioning device. The navigation unit may include a recorder in which a user inputs a location from time to time. The recorded location may be a particular location in a defined coordinate system or a general description of a location, e.g., in a particular aisle next to a particular bin.

The processing logic may determine the location of the machine-readable target at a time the image was captured by determining a time the image was captured and determining the location of the machine-readable target at that time based on the received location information. The processing logic may determine the time the image was captured based on a time in a body of the message from the image capturing device including the image. The processing logic may determine the location of the machine-readable target at that time by locating an entry in the received location information with that time or by locating the entry in the received location information having a time closest to that time.

In one embodiment, the processing logic determines, for each of the subset of the plurality of images, a location of the machine-readable target based on an analysis of the image rather than separately received location information. For example, in one embodiment, the machine-readable target encodes information that can be decoded once detected using image processing techniques. The machine-readable target may encode information indicating the location of the machine-readable target. In one embodiment, the machine-readable target is shown on a display connected to a navigation unit and processing device. The processing device repeatedly receives current location information from the navigation unit at different times, encodes the current location information in a machine-readable target (e.g., a QR code), and displays the machine-readable target.

At block 350, the processing logic aggregates data indicative of the locations to generate field of view data indicative of a field of view of the image capturing device. The field of view data may be indicative of a set of locations at which the image capturing device may capture an image of an object. Thus, the field of view data may be indicative of a field of view including or encompassing the locations at which the machine-readable target was detected. In one embodiment, the field of view data may simply be the set of locations. In another embodiment, the field of view data may describe a polygon or other two-dimensional shape including the locations. In another embodiment, the field of view data may describe a three-dimensional shape (e.g., using additional information such as altitude, position, and orientation information of the image capturing device) based on the locations. For example, a polygon including the locations may be projected back to the location of the image capturing device to create a "cone" or other three-dimensional shape describing the field of view. The processing logic may generate the field of view data based on the locations in other ways.

At block 360, the processing logic stores the field of view data in association with the device identifier. The processing logic may store the field of view data in association with the device identifier in a data structure in a memory. The data structure may be, for example, a table, a database or other data structure including a number of entries, each entry including a device identifier element that stores a device identifier and a field of view element that stores the field of view data. Storing the field of view data in association with the device identifier may include generating a new entry or updating an existing entry.

For example, the processing logic may determine that the data structure includes an entry for the device identifier and store the field of view data in the entry. The processing logic may determine that the data structure does not include an entry for the device identifier and create a new entry for the device identifier and store the device identifier and the field of view data in the new entry.

The field of view of each image capturing device may be used to track a moving subject as it moves throughout a location or to determine whether an event at a particular location was captured by an image capturing device (either a particular image capturing device or by any image capturing device of the system).

The data structure may be used in a number of ways, e.g., as described below with respect to FIG. 3B. In one embodiment, the data structure may be searched by location to retrieve images associated with that location. For example, using a software interface, a user may enter a particular location and retrieve images of that location without knowing, a priori, the device identifier of the image capturing device having that location within its field of view.

In one embodiment, the processing logic receives search data and selects an entry of the data structure based on the search data. For example, the search data may be a particular location or a subject identifier and the entry may be selected when the search data matches the data in the entry. The processing logic may determine a device identifier of the selected entry and retrieve images captured by the image capturing device having that device identifier.

In another embodiment, the field of view data for a number of image capturing devices is aggregated to generate a map of the site illustrating locations in the field of view of at least one image capturing device and illustrating locations not in the field of view of at least one image capturing device. Such a mapping may be used to identify locations not captured by the system (e.g., blind spots) and to reposition one or more image capturing devices to reduce or eliminate these locations that are not within the field of view of at least one image capturing device.

Figure 3B:
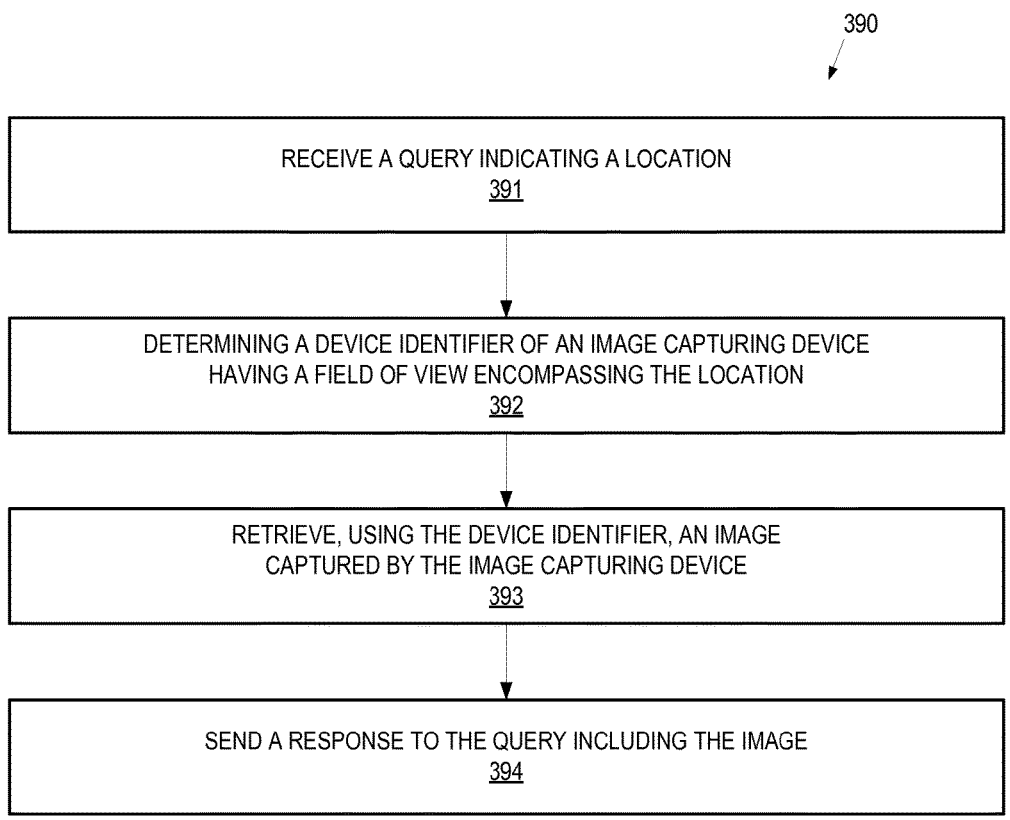
FIG. 3B is a flowchart illustrating an embodiment of method of responding to a query.

FIG. 3B is a flowchart illustrating an embodiment of a method 390 of responding to a query. The method 390 may be performed by processing logic that may include hardware (e.g., circuitry, dedicated logic, programmable logic, microcode, etc.), software (e.g., instructions executed by a processing device), firmware or a combination thereof. For example, the method 390 may be performed by the surveillance system 100 of FIG. 1. It is to be appreciated that the method 390 may be performed for any number of image capturing devices consecutively or concurrently. However, for ease of reference, the method 390 is described for a single image capturing device in FIG. 3B.

At block 391 of method 390, the processing logic receives a query indicating an objective. The objective may be, for example, a subject or a location. Thus, the query may include data indicative of a subject, such as a subject identifier, or data indicative of a location. The location data may indicate the location as a particular location in a defined coordinate system or a general description of a location, e.g., near the entrance, between a first station and a second station, in a first aisle of the storage.

At block 392, the processing logic determines a device identifier of an image capturing device having a view of the objective. The processing logic may determine the device identifier using a data structure as described above that includes a plurality of entries, each entry including a device identifier element that stores a device identifier of an image capturing device. As also described above, each entry may further include a view element that stores view data indicative of the view of the image capturing device. The view element may be a subject element that stores data indicative of a subject in view of the image capturing device, e.g., a subject identifier. The view element may be a field of view element that stores data indicative of a field of view of the image capturing device. Thus, determining the device identifier may include locating, in a view element of an entry of a data structure, view data matching the query and determining the device identifier stored in a device identifier element of the entry of the data structure.

As noted above, the objective may include at least one of a subject identifier of a subject in view of the image capturing device or a location encompassed by a field of view of the image capturing device. The processing logic may determine the device identifier by searching the field of view elements to find field of view data indicative of a field of view that encompasses the location. The processing logic may determine the device identifier by identifying the device identifier of the image capturing device having field of view data that indicates a location closest to the location of the query. In one embodiment, the processing logic determines the device identifier by matching a location identifier in the query with a location identifier stored in a field of view element of entries of the data structure.

The processing logic may determine device identifiers of more than one image capturing device in the case that multiple image capturing devices have fields of view that encompass the location.

At block 393, the processing logic retrieves an image captured by the image capturing device associated with the determined device identifier. The processing logic may retrieve multiple images captured by a single image capturing device. The processing logic may also retrieve multiple images captured by multiple image capturing devices in the case that more than one device identifier is determined in block 392.

The images may be retrieved from the data structure described above, each entry of the data structure including an image element that stores an image (or more than one image) captured by the image capturing device. The images may be retrieved from a separate data structure that is searchable or sortable by device identifier.

At block 394, the processing logic sends a response to the query including the retrieved image. The response may include one or more images. The response may include additional information, such as the determined device identifiers or subjects in view of the image capturing device as indicated by subject identifier elements of the entries of the data structure.

Figure 4:
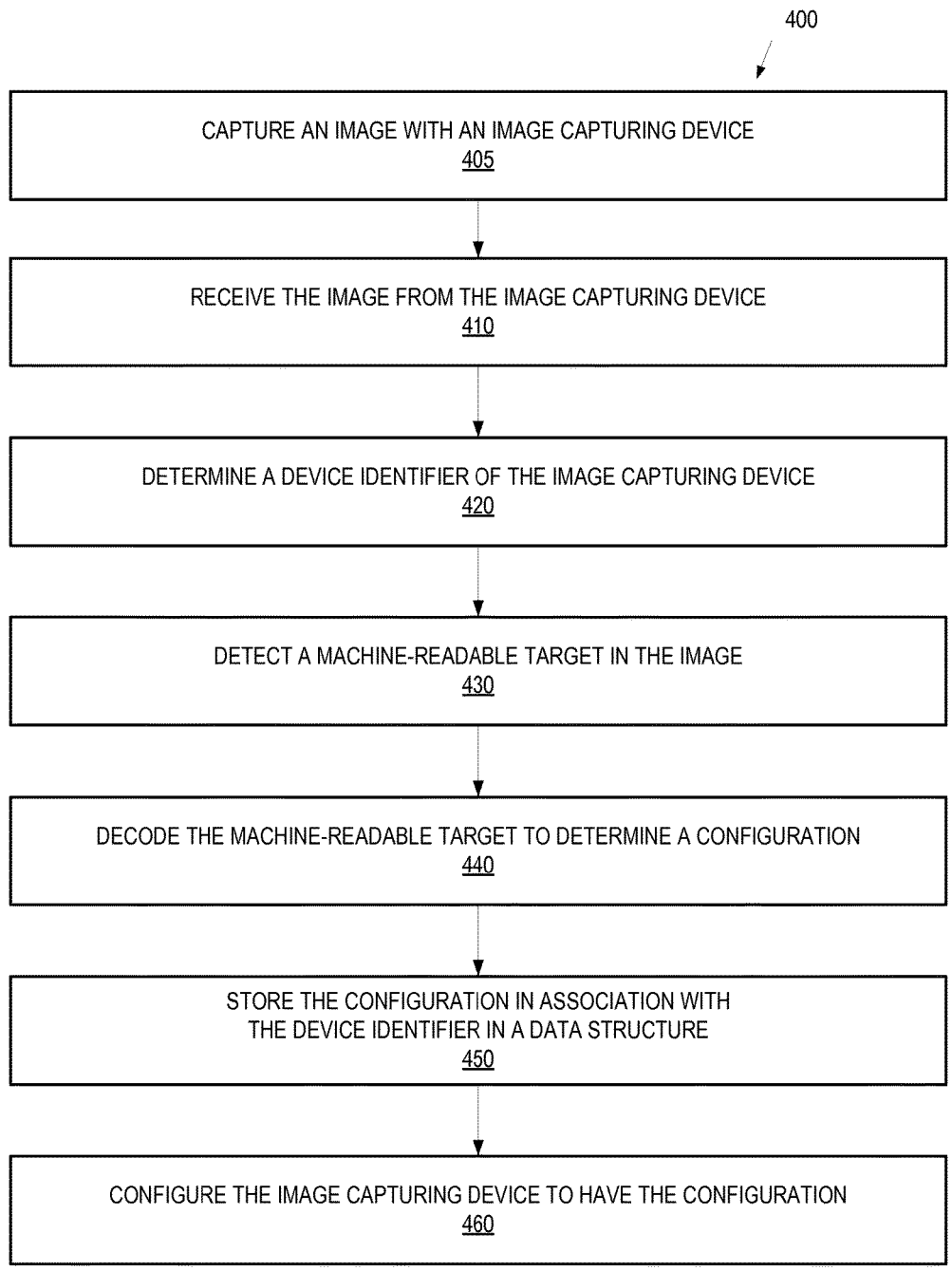
FIG. 4 is a flowchart illustrating an embodiment of a method of configuring an image capturing device.

FIG. 4 is a flowchart illustrating an embodiment of a method 400 of configuring an image capturing device. The method 400 may be performed by processing logic that may include hardware (e.g., circuitry, dedicated logic, programmable logic, microcode, etc.), software (e.g., instructions executed by a processing device), firmware or a combination thereof. For example, the method 400 may be performed by the surveillance system 100 of FIG. 1. It is to be appreciated that the method 400 may be performed for any number of images or image capturing devices consecutively or concurrently. However, for ease of reference, the method 400 is described for a single image of a single image capturing device in FIG. 4.

The method 400 may be performed, for one or multiple image capturing devices, in response to a command to configure one or more image capturing devices of a system. For example, the method 400 may be initially performed upon deployment of the image capturing device or in response to a reconfiguration of a site or event occurring at the site.

The method 400 may be used to reconfigure image capturing devices that are exposed to unique local circumstances, such as dust or fog, so that they may adapt to these situations. An image capturing device may be reconfigured for a temporary amount of time due to locally varying circumstances, such as construction. Rather than attempting to determine which image capturing devices may be affected by special circumstances, a machine-readable target from which a configuration may be determined may be moved around the area that will be affected. All image capturing devices detecting the machine-readable target may be reconfigured using the configuration.

At block 405 of method 400, the processing logic captures an image with an image capturing device and, at block 410, receives an image from an image capturing device. The image may be a color or black-and-white image. The image may be a frame of a video stream received from the image capturing device. The image may be received over a wired or wireless communication link. In one embodiment, the image is received over the internet using an IP protocol. In another embodiment, the image capturing device captures an image and the image is received by processing logic within the image capturing device.

At block 420, the processing logic determines a device identifier of the image capturing device. In one embodiment, the device identifier is an IP address of the image capturing device. In one embodiment, the image is received (in block 410) as part of a message. The message may include the IP address of the image capturing device and the processing logic in routing information which may be located in a header of the message. The IP address of the image capturing device may be determined by analyzing the routing information. The device identifier may be a MAC (media access control) address of the image capturing device. The MAC address may be included in the body of the message.

The device identifier may be a device name, a device number, or any other identifier that uniquely identifies the image capturing device. Although, as noted above, the device identifier may be an IP address or MAC address of the image capturing device, the device identifier may also be derived from the IP address or MAC address. For example, the device identifier may be determined based on a table that associates IP addresses with specific device identifiers.

At block 430, the processing logic detects a machine-readable target in the image. The machine-readable target may include a matrix barcode (e.g., a QR [quick response] code), a one-dimensional barcode, a color pattern, machine-readable text, or any other detectable target. The machine-readable target may be detected using computer image processing techniques. The processing logic may detect one or more machine-readable targets in a single image.

At block 440, the processing logic decodes the machine-readable target to determine a configuration. The configuration may include one or more configuration parameters, such as exposure time, shutter speed, spatial orientation, day/night mode, gain, frame rate, etc. The machine-readable target may encode the configuration parameters or may encode a reference to a web-based configuration file including the configuration parameters.

At block 450, the processing logic stores the configuration in association with the device identifier. The processing logic may store the configuration in association with the device identifier in a data structure in a memory. The data structure may be, for example, a table, a database or other data structure including a number of entries, each entry including a device identifier element that stores a device identifier and a configuration element that stores the configuration. Storing the configuration in association with the device identifier may include generating a new entry or updating an existing entry.

For example, the processing logic may determine that the data structure includes an entry for the device identifier and store the configuration in the entry. The processing logic may determine that the data structure does not include an entry for the device identifier and create a new entry for the device identifier and store the device identifier and the configuration in the new entry.

In one embodiment, the processing logic may store the configuration in association with the device identifier in a cache or a volatile memory rather than an entry of data structure in long-term (or secondary) memory. The processing logic may not continue to store the configuration in association with the device identifier once the image capturing device is configured to have the configuration (in block 460, described below). In other embodiments, the processing logic may continue to store the configuration in association with the device identifier once the image capturing device is configured. For example, the configuration may be stored in a configuration element of an entry in a data structure including a device identifier entry storing the device identifier of the image capturing device.

At block 460, the processing logic configures the image capturing device to have the configuration or otherwise configures the image capturing device according to the configuration. In one embodiment, the processing logic generates a configuration command including the configuration. In another embodiment, the machine-readable target encodes a configuration command including the configuration. The processing logic may send the configuration command to the image capturing device to configure the image capturing device. The processing logic may send the configuration command via a message using IP protocol including the IP address of the image capturing device (e.g., a device identifier) in a header of the message. In one embodiment, the processing logic is within the image capturing device and configuring the image capturing device includes executing the configuration command by the processing logic within the image capturing device.

Figure 5:
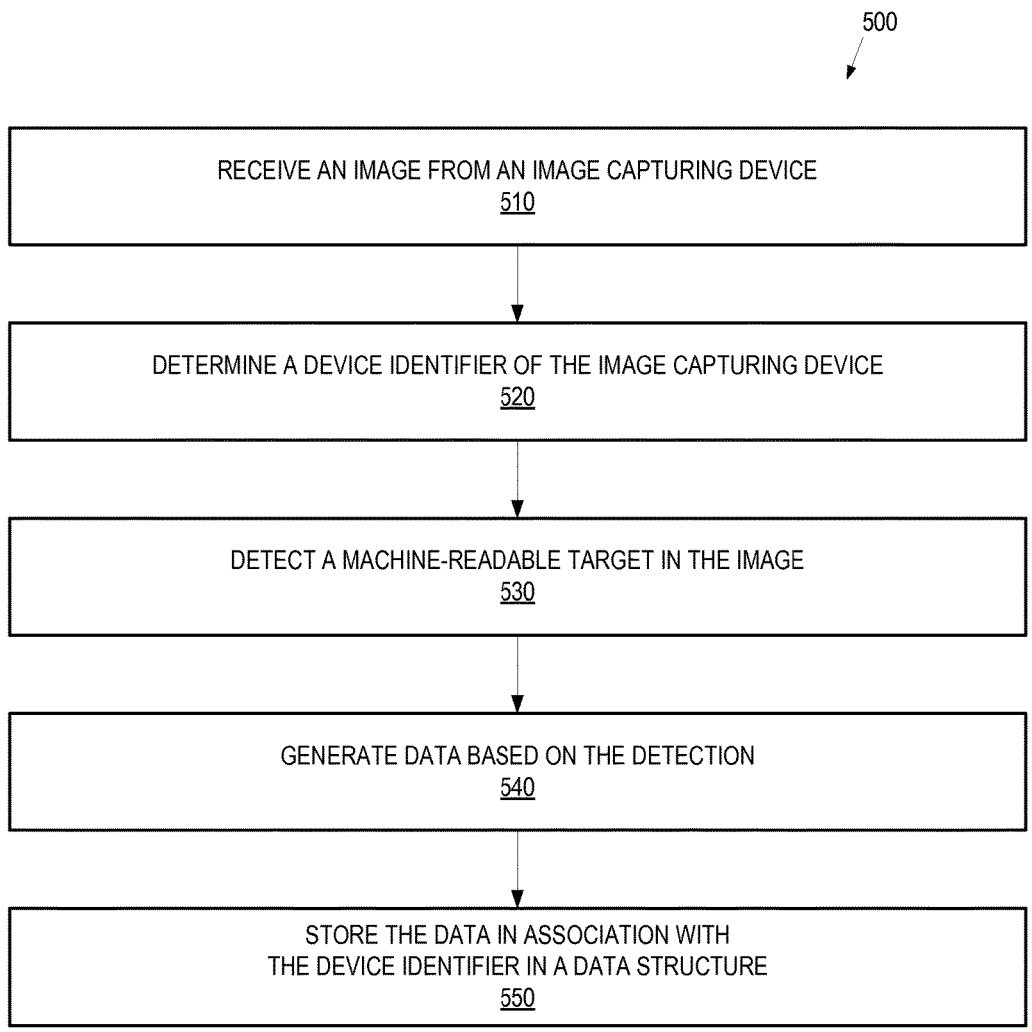
FIG. 5 is a flowchart illustrating an embodiment of a method of updating a data structure.

FIG. 5 is a flowchart illustrating an embodiment of a method 500 of updating a data structure. The method 500 may be performed by processing logic that may include hardware (e.g., circuitry, dedicated logic, programmable logic, microcode, etc.), software (e.g., instructions executed by a processing device), firmware or a combination thereof. For example, the method 500 may be performed by the surveillance system 100 of FIG. 1. It is to be appreciated that the method 500 may be performed for any number of images or image capturing devices consecutively or concurrently. However, for ease of reference, the method 500 is described for a single image of a single image capturing device in FIG. 5.

At block 510 of method 500, the processing logic receives at least one image from an image capturing device. The image may be a color or black-and-white image. The image may be a frame of a video stream received from the image capturing device. The image may be received over a wired or wireless communication link. In one embodiment, the image is received over the internet using an IP protocol.

At block 520, the processing logic determines a device identifier of the image capturing device. In one embodiment, the device identifier is an IP address of the image capturing device. In one embodiment, the image is received (in block 510) as part of a message. The message may include the IP address of the image capturing device and the processing logic in routing information which may be located in a header of the message. The IP address of the image capturing device may be determined by analyzing the routing information. The device identifier may be a MAC (media access control) address of the image capturing device. The MAC address may be included in the body of the message.

The device identifier may be a device name, a device number, or any other identifier that uniquely identifies the image capturing device. Although, as noted above, the device identifier may be an IP address or MAC address of the image capturing device, the device identifier may also be derived from the IP address or MAC address. For example, the device identifier may be determined based on a table that associates IP addresses with specific device identifiers.

At block 530, the processing logic detects a machine-readable target in at least a subset of the at least one image. The machine-readable target may include a matrix barcode (e.g., a QR [quick response] code), a one-dimensional barcode, a color pattern, machine-readable text, or any other detectable target. The machine-readable target may be detected using computer image processing techniques. The processing logic may detect one or more machine-readable targets in a single image.

At block 540, the processing logic generates data based on the detection. The processing logic generate view data indicative of a view of the image capturing device based on the detection. The processing logic may generate subject data indicative of a subject in view of the image capturing device, e.g., a subject identifier. The processing logic may generate field of view data indicative of a field of view of the image capturing device. The processing logic may decode the machine-readable target to generate data indicative of information encoded by the machine-readable target. In one embodiment, the processing logic generates the data by decoding the machine-readable target to determine a subject identifier of a subject in view of the image as described in detail above with respect to FIG. 2. In one embodiment, the processing logic generates the data by decoding the machine-readable target to determine a configuration for the image capturing device as described in detail above with respect to FIG. 4. In one embodiment, the processing logic may generate a camera name by decoding the machine-readable target and associate the camera name with the device identifier, e.g., an IP address. In one embodiment, the processing logic may generate position data (e.g., a height of the image capturing device, an angle of the image capturing device, a location of the image capturing device in a known coordinate system of the site, etc.) by decoding the machine-readable target. The processing logic may generate other data indicative of the information encoded by the machine-readable target.

The processing logic may generate data indicating that the machine-readable target has been detected in the subset of the at least one image. In one embodiment, the processing logic generates the data by determining a time each of the subset of the at least one image was captured and determining a location of the machine-readable target at the time. The processing logic may generate field of view data indicative of a field of view of the image capturing device encompassing a plurality of locations comprising the location and other locations at which the machine-readable target was detected by the image capturing device as described in detail above with respect to FIG. 3A. In one embodiment, the processing logic generates inspection data indicating that the image capturing device has passed a manual inspection (e.g., for fire safety or other purposes) based on detection of the machine-readable target. For example, the processing logic may determine a time the image was captured and update a database entry to indicate that the image processing device passed a manual inspection at the time. The processing logic may generate other data based on the detection.

At block 550, the processing logic stores the data in association with the device identifier. The processing logic may store the data in association with the device identifier in a data structure in a memory. The data structure may be stored in short-term memory, such as a cache or volatile memory. The data structure may be stored in long-term memory, such as a hard drive or a cloud-based storage. The data structure may be, for example, a table, a database or other data structure including a number of entries, each entry including a device identifier element that stores a device identifier and one or more additional elements that stores the data.

Storing the data in association with the device identifier may include generating a new entry or updating an existing entry. For example, the processing logic may determine that the data structure includes an entry for the device identifier and store the data in the entry. The processing logic may determine that the data structure does not include an entry for the device identifier and create a new entry for the device identifier and store the device identifier and the data in the new entry.

Figure 6:
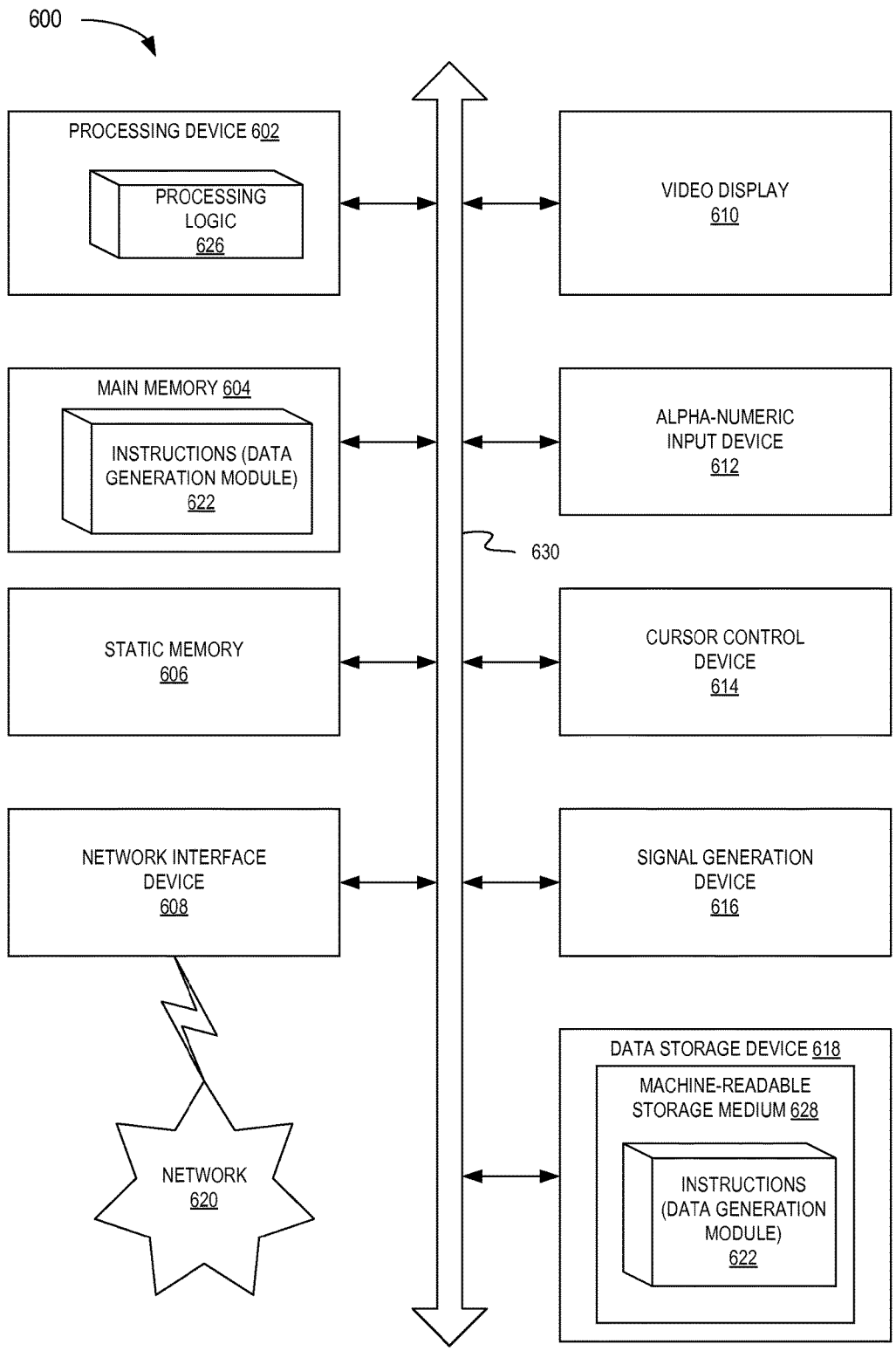
FIG. 6 illustrates a functional block diagram of an embodiment of an electronic device.

FIG. 6 illustrates a diagrammatic representation of a machine in the exemplary form of a computer system 600 within which a set of instructions for causing the machine to perform any one or more of the methodologies discussed herein may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent the surveillance system 100 of FIG. 1.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of the data generation module for performing one or more of the methods of FIGS. 2-5) embodying any one or more of the methodologies or functions described herein. The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various systems may be used with programs in accordance with the teachings herein, or it may prove convenient to construct a more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An image processing system comprising:
    a plurality of cameras generating images at a site;
    a memory to store a data structure comprising a plurality of entries, each of the plurality of entries comprising a device identifier element storing a device identifier of one of the plurality of cameras; and
    a processing device operatively coupled to the memory, the processing device to:
        detect, in a first image from a first camera of the plurality of cameras, a first matrix barcode of a plurality of matrix barcodes applied to various subjects of the site;
        decode the first matrix barcode to determine a subject identifier of a subject in view of the first camera;
        store the subject identifier of the subject in view of the first camera in association with a first device identifier of the first camera in a first entry of the plurality of entries of the data structure;
        detect, in at least a subset of a plurality of second images from a second camera of the plurality of cameras, a second matrix barcode;

determine, for each second image of the subset, a location at the site of the second matrix barcode at a time each second image of the subset was generated;

aggregate data indicating the location at the site of the second matrix barcode at the time each second image of the subset was generated to generate field of view data indicating a field of view of the second camera; and store the field of view data indicating the field of view of the second camera in association with a second device identifier of the second camera in a second entry of the plurality of entries of the data structure.

2. The image processing system of claim 1, wherein the processing device is further to:

detect, in a third image from a third camera of the plurality of cameras, a third matrix barcode;

decode the third matrix barcode to determine a configuration; and send a configuration command to the third camera to configure the third camera according to the configuration.

3. The image processing system of claim 1, wherein the first device identifier comprises an IP (internet protocol) address of the first camera.

4. The image processing system of claim 1, wherein determining the location at the site comprises:

receiving location data as a function of time from a navigation unit collocated with the second matrix barcode as it is moved to various locations of the site.

5. A method comprising:

receiving, by a processing device, at least one image captured by an image capturing device;

determining, by the processing device, a device identifier of the image capturing device;

detecting, by the processing device, a machine-readable target in the at least one image captured by the image capturing device;

determining, by the processing device, at least one location of the machine-readable target in the at least one image captured by the image capturing device;

generating, by the processing device, view data representing the at least one location of the machine-readable target detected in the at least one image captured by the image capturing device, wherein generating the view data comprises aggregating data that indicates the at least one location, and wherein the view data indicates at least one of a subject in view of the image capturing device or a field of view of the image capturing device; and storing, by the processing device, the view data in association with the device identifier of the image capturing device in a data structure.

6. The method of claim 5, wherein the device identifier comprises an internet protocol (IP) address of the image capturing device.

7. The method of claim 5, wherein the machine-readable target comprises at least one of a matrix barcode, a one-dimensional barcode, or a color pattern.

8. The method of claim 5, wherein determining the at least one location of the machine-readable target for the at least one image comprises:

receiving location data that indicates the at least one location of the machine-readable target as a function of time;

determining a time at which the at least one image was captured; and determining, using the location data, the at least one location of the machine-readable target for the at least one image at the time the at least one image was captured.

9. The method of claim 5, wherein generating the view data comprises defining a shape that encompasses the at least one location.

10. The method of claim 9, wherein generating the view data comprises defining a three-dimensional shape based on a position of the image capturing device.

11. The method of claim 5, further comprising generating a map of a site illustrating the at least one location in the field of view of the image capturing device and locations in fields of view of other image capturing devices.

12. The method of claim 5, wherein generating the view data comprises decoding the machine-readable target to determine a subject identifier that indicates the subject in view of the image capturing device.

13. The method of claim 12, further comprising:

determining that the subject identifier does not match an expected subject identifier; and generating a notification that the image capturing device is misaligned.

14. The method of claim 5, wherein storing the view data in association with the device identifier in the data structure comprises storing the view data in an entry of a database comprising a plurality of entries, each of the plurality of entries comprising a device identifier element storing a device identifier of one of a plurality of image capturing devices.

15. A non-transitory computer-readable medium having instructions encoded thereon which, when executed by a processing device, cause the processing device to:

receive, by the processing device, a query comprising at least one of a subject identifier of a subject in view of an image capturing device or data that indicates a location encompassed by a field of view of the image capturing device;

determine, by the processing device, a device identifier of the image capturing device having a view of the at least one of the subject or the location, wherein the view of the image capturing device is determined based at least in part on a machine-readable target detected in at least one image captured by the image capturing device, the machine-readable target indicating the at least one of the subject or the location;

retrieve, by the processing device and using the device identifier, an image of the at least one of the subject or the location captured by the image capturing device; and send, by the processing device, a response to the query comprising the image of the subject or the location.

16. The non-transitory computer-readable medium of claim 15, wherein to determine the device identifier, the processing device to:

locate, in an element of an entry of a data structure, view data matching the query; and determine the device identifier stored in a device identifier element of the entry of the data structure.

17. The non-transitory computer-readable medium of claim 15, wherein the response to the query further comprises the device identifier.

* * * * *